United States Patent [19]

Nomura

[11] Patent Number: 4,484,664

[45] Date of Patent: Nov. 27, 1984

[54] EMERGENCY DRIVE DEVICE FOR AN A.C. ELEVATOR

[75] Inventor: Masami Nomura, Nagoya, Japan

[73] Assignee: Mitsubishi Denki Kabushiki Kaisha, Tokyo, Japan

[21] Appl. No.: 410,598

[22] Filed: Aug. 23, 1982

[30] Foreign Application Priority Data

Aug. 25, 1981 [JP] Japan ................ 56-133026

[51] Int. Cl.³ ............................. B66B 5/02
[52] U.S. Cl. ................................. 187/29 R
[58] Field of Search ............ 187/29; 307/48, 64, 307/66; 318/762

[56] References Cited

U.S. PATENT DOCUMENTS

| 4,316,097 | 2/1982 | Reynolds | 187/29 R X |
| 4,340,823 | 7/1982 | Miyazawa | 307/66 |
| 4,353,023 | 10/1982 | Kawada et al. | 318/762 |
| 4,366,427 | 12/1982 | Walker et al. | 318/762 X |
| 4,376,471 | 3/1983 | Uchino et al. | 187/29 R |

FOREIGN PATENT DOCUMENTS 56-74086 6/1981 Japan.

Primary Examiner—J. V. Truhe
Assistant Examiner—W. E. Duncanson, Jr.
Attorney, Agent, or Firm—Wenderoth, Lind & Ponack

[57] ABSTRACT

Described is an emergency drive device for an A.C. elevator which comprises; and alternating current motor for driving a car, an inverter for converting a direct current into an alternating current of variable frequency and supplying the resulting alternating current to said alternating current motor, and an emergency power source connected across input terminals of the inverter with the same polarity as said input terminals and designed to supply direct current power to the drive device.

3 Claims, 4 Drawing Figures

EMERGENCY DRIVE DEVICE FOR AN A.C. ELEVATOR

BACKGROUND OF THE INVENTION

This invention relates to an improved driving device whereby the elevator driven by an A.C. motor may be driven in an emergency as during a power supply interruption.

Usually, in case of a power supply interruption at the power source for an elevator, the elevator is continued to be driven by a switchover from said power source to an emergency power source. FIG. 1 shows a drive device which is used at the time of power supply interruption, wherein the motor for driving the elevator car is an induction motor and is driven by an A.C. power of a variable frequency.

In the drawing, the numeral 1 designates a three-phase power source, and the numeral 2 a converter for converting A.C. power having a constant frequency into A.C. power having a variable frequency, as will be described below. The numeral 3 designates an emergency power source such as a battery. The numeral 4 designates an emergency inverter for converting the D.C. power from the emergency power source into a three-phase A.C. power of the constant frequency. The numeral 5 designates a normal operation contact connected to the converter 2 and turned "on" and "off" during normal operation and at the time of a power supply interruption of the three-phase A.C. source 1, respectively. The numeral 6 designates a supply interruption contact connected to the emergency converter 4 and turned "on" and "off" at the time of supply interruption and at the time of normal operation, respectively. The numeral 7 designates a three-phase induction motor connected to both the contacts 5, 6. The numeral 8 designates a drive sheave of a winch driven by the motor 7. The numeral 9 designates a main cable wound about sheave 8. The numerals 10, 11 designate a car and a balance weight coupled to both ends of the main cable 9, respectively.

During normal operation, the contact 5 is closed, so that the A.C. power of variable frequency is supplied to the motor 7 for controlling the speed of the car 10. During supply interruption, the contact 5 is opened and the contact 6 closed, so that A.C. power is supplied to the motor 7 from the emergency inverter 4 for driving the car 10.

This conventional device has, however, a drawback in that the drive means employed during a supply interruption tend to be costly because of the provision of the emergency inverter 4.

SUMMARY OF THE INVENTION

This invention envisages a system used to obviate such a drawback and provides an emergency drive system for an A.C. elevator wherein the inverter employed during normal operation is employed simultaneously during supply interruption, for dispensing with the emergency inverter.

DESCRIPTION OF PREFERRED EMBODIMENTS

Figure 1:
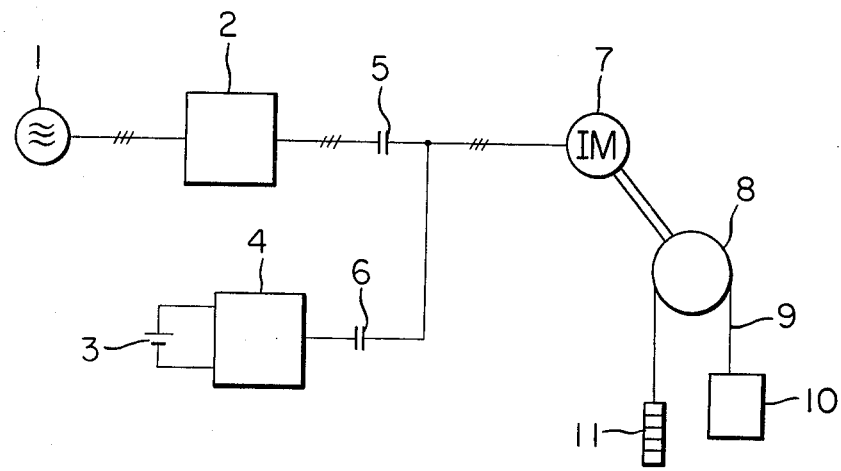
FIG. 1 is a schematic view showing the conventional drive system for the A.C. elevator.
Figure 2:
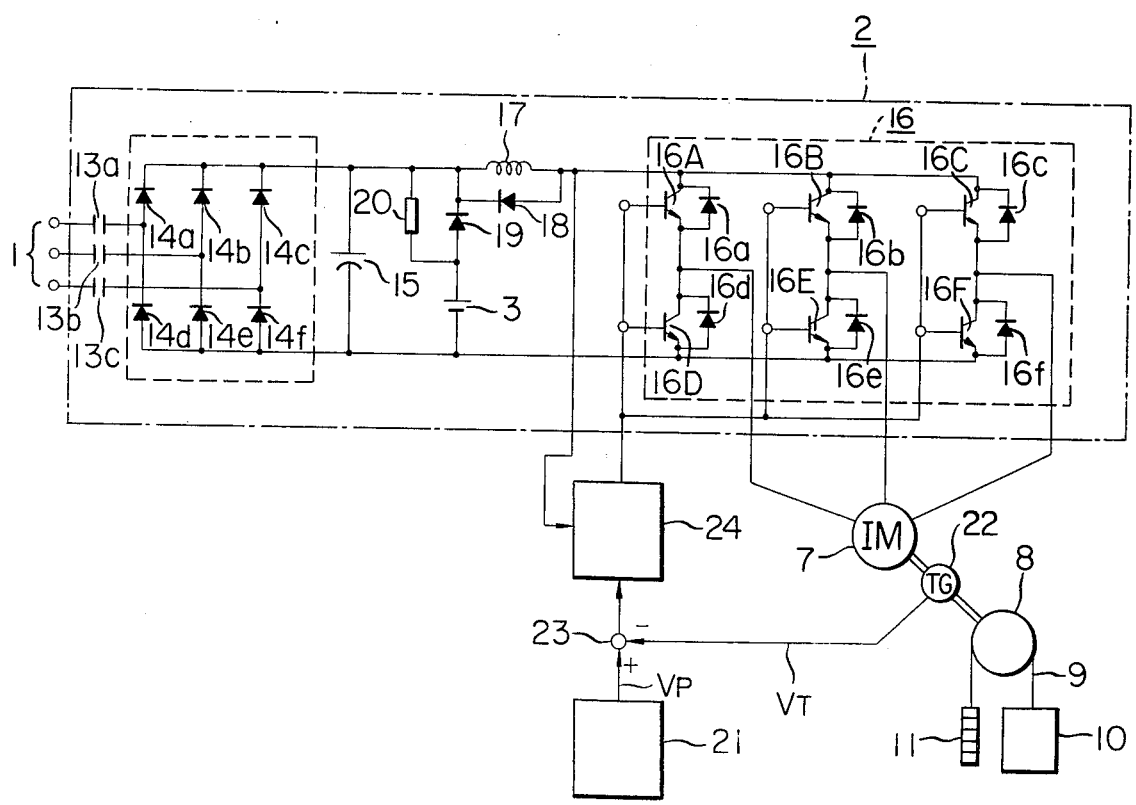
FIG. 2 is a circuit diagram showing an embodiment of the emergency drive system for the A.C. elevator according to the present invention.

Reference is made to FIG. 2 for illustrating an embodiment of the present invention.

In the drawing, the numerals 13a to 13c designate driving contacts connected to a power source 1 and turned on and off at the time of travel and halt of the car 10, respectively. The numeral 14 designates a rectifier formed by diodes 14a to 14f arranged as a three-phase full-wave rectifier circuit and having its input side connected to contacts 13a to 13c. The numeral 15 designates a smoothing capacitor connected across the output terminals of the rectifier 14. The numeral 16 designates an inverter made up of diodes 16a to 16f and transistors 16A to 16F and used for converting a constant D.C. voltage into an A.C. voltage having desired magnitude and frequency. The numeral 17 designates a reactor coil connected in one of input lines of the inverter 16. The numeral 18 designates a diode connected across both terminals of the reactor 17. The numeral 19 designates a diode connected across input terminals of the inverter 16 with the same polarity as these input terminals, and also connected in series with the emergency power source 3 and with the same polarity as the source 3. The numeral 20 designates a current limiting resistor connected across both terminals of the diode 19. The numeral 21 designates a speed command generator for issuing a speed command signal Vp. The numeral 22 designates a speed sensor coupled to the motor 7 and designed to produce a speed signal Vt representative of the actual speed of the car 10. The numeral 23 designates an adder for calculating an offset between the input command signals Vp and Vt. The numeral 24 designates an inverter control circuit connected between the adder 23 and the input side of the inverter 16 and designed to control the base terminals of the transistors 16A to 16F of the inverter 16 depending on the above offset signal.

The device of the present embodiment operates as follows:

When an elevator call is produced at the time of normal operation, driving contacts 13a to 13c are closed, so that the rectifier 14 yields a D.C. output of a predetermined voltage. The control circuit 24 responds to the offset signal between the speed command signal Vp and the actual speed signal Vt to control the transistors 16A to 16F so that an A.C. power of variable frequency is generated at the output side of the inverter 16. In this manner, the motor 7 is driven to cause the car 10 to travel.

During supply interruption of the power source 1, the D.C. output from the rectifier 14 disappears so that the emergency power source 3 is now operative to supply D.C. power to the inverter 16 through diode 19. During supply interruption, speed command generator 21 issues the speed command signal Vp lower than that issued during normal operation. The control circuit 24 responds to this signal Vp to control the base electrodes of the transistors 16A to 16F for converting the direct current of the emergency power source 3 into an alternating current of the predetermined frequency to drive the motor (7) to cause the car 10 to travel at a lower speed to the near-by floor.

When the car 10 travels down with a heavy load or up with a light load, the motor is driven with a regenerative braking so that the power is returned to the electrical source. When the D.C. voltage has attained more than a predetermined magnitude at this time, the control device 24 operates to turn certain ones of the transistors 16A to 16F "on" and "off". Direct current is now supplied to the motor 7 through diodes 16a, 16f for direct current braking of the motor 7. In this manner, the kinetic energy is not returned to the D.C. side, but is consumed at the rotor of the motor 7, and the power to be otherwise returned to the D.C. side is disposed of. Hence, the necessity for providing special devices for disposing of the returned power may be eliminated.

Figure 3:
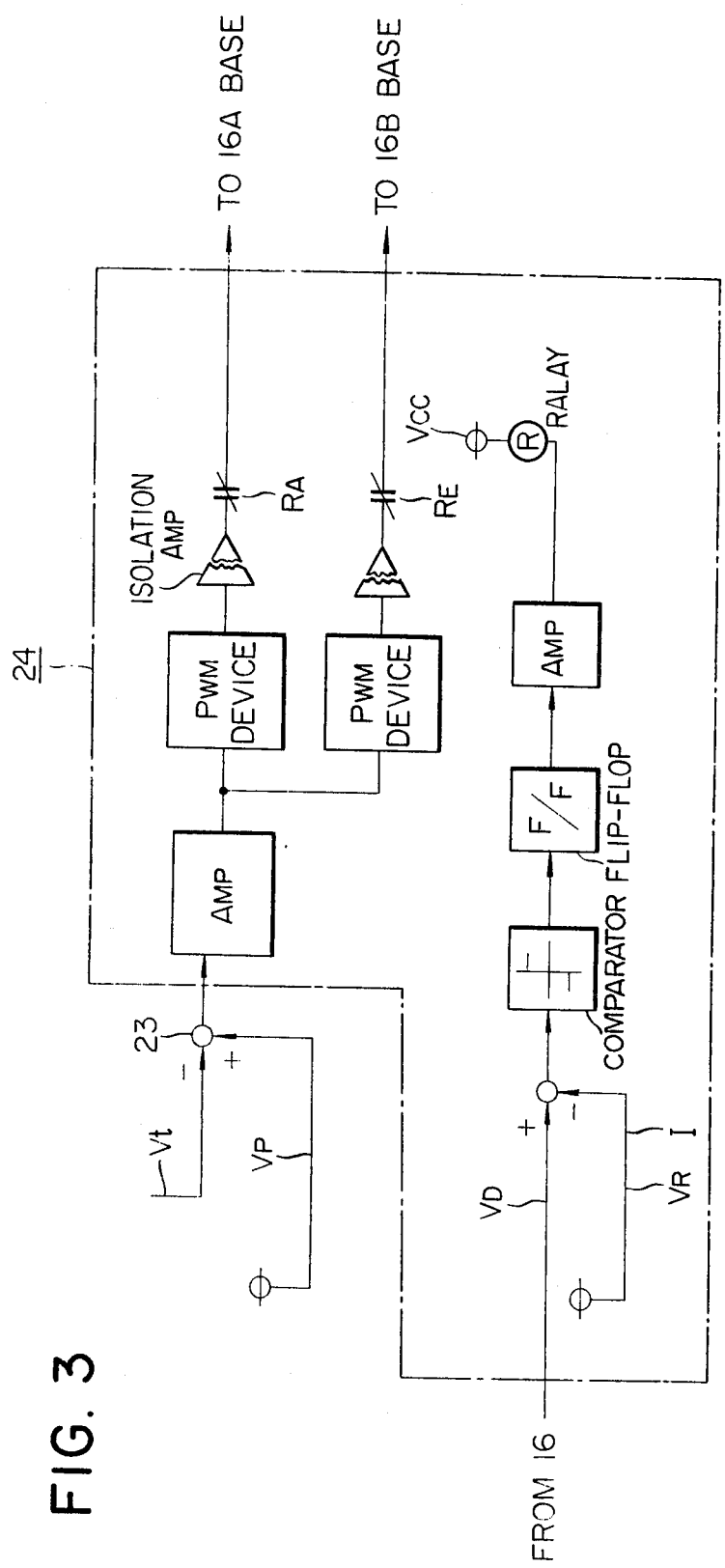
FIG. 3 is a block diagram showing the control device used in the circuit of FIG. 2.

FIG. 3 shows a portion of the control circuit 24 designed to effect such direct current braking. Referring to FIG. 3, once the D.C. side voltage $V_D$ exceeds a reference voltage $V_R$, a signal for commanding the issuance of A.C. voltage is interrupted from transistors by disconnecting a relay R so that the signal for commanding D.C. braking is supplied to the base electrodes of the transistors 16A, 16E to control the on/off operation of the transistors 16A and 16E.

Preferably, the transistors to be controlled in their on/off operations are not fixed but may be switched sequentially from one set to another set of transistors to make use of all of the transistors 16A to 16F thereby avoiding the shortening of the service life by utilizing transistors.

The limiting resistor 20 through which the emergency power source 3 is charged and readied for emergency operation, may be dispensed with if so desired.

Figure 4:
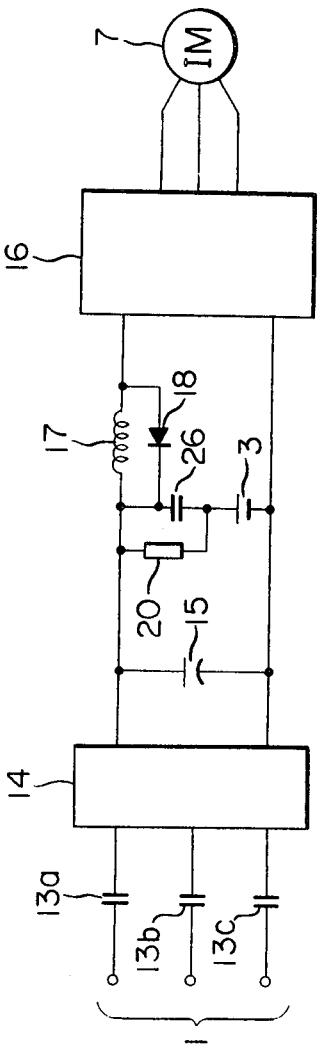
FIG. 4 is a partial circuit diagram of a modified embodiment of the invention corresponding to a portion of FIG. 2.

FIG. 4 illustrates a modified embodiment of the invention.

In the drawing, the numeral 26 designates a supply interruption contact used in place of the diode 19 of FIG. 2 and turned "on" and "off" at the time of power supply interruption and at the time of normal operation, respectively. The remaining components are the same as those shown in FIG. 2.

The contact 26 is turned "on" only during power supply interruption to supply the D.C. power of the emergency power source 3 to the inverter 16.

It may be contemplated that, when the regenerative power is returned to the D.C. side, it flows through the contact 26 into the emergency power source 3, resulting in an elevated voltage at the terminal of the emergency power source 3 and occasionally causing undesirable toxic gases or other effects undesirable in the emergency power source 3. However, this does not happen because the motor 7 is subjected to D.C. braking when the voltage at the D.C. side of the inverter 16 exceeds a predetermined value, as mentioned above.

While the variable voltage variable frequency device of the pulse width modulation system has been shown and described, the present invention may also be applied to other types of variable voltage variable frequency devices as well.

Also, while the case of supply interruption has been shown and described, the present invention may be applied to the case where the elevator operation has been incapacitated by other accidents.

According to the present invention, as depicted above, since the emergency power source is connected across and with the same polarity as the input terminals of the inverter designed to supply A.C. power of a variable frequency to the A.C. motor, the inverter to be used for normal operation may also be used for emergency operation. Hence the necessity for providing an additional inverter for emergency is eliminated, resulting in reduced manufacture costs.

In addition, during regenerative braking of the motor, when the voltage at the D.C. side of the inverter exceeds a predetermined value, the motor is subjected to direct current braking by control elements included in the inverter. Hence, the regenerative power is not returned to the direct current side but is consumed in the motor thereby allowing special devices used for disposing of the regenerative power to be eliminated.

What is claimed is:

1. An emergency driving device for an A.C. elevator comprising:
   a rectifier connected to an A.C. power source for converting an alternating current input into a direct current output;
   and inverter for receiving said direct current output of said rectifier for converting said output of said rectifier into an alternating current output of a variable frequency;
   an A.C. motor which is driven by said output of said inverter; and
   an emergency power source connected across input terminals of said inverter in the same polarity as said input terminals;
   wherein said emergency power source has an output voltage which is selected to be to lower than the voltage across said input terminals of said inverter during normal operation and wherein a blocking means is further provided for blocking the flow of the current to said emergency power source during normal operation, said blocking means being in series with said emergency power source and said normal operation corresponding to that period of time when said A.C. power source if providing alternating current to said rectifier.

2. A device as claimed in claim 1, wherein:
   a diode is connected in series with said emergency power source.

3. A device as claimed in claim 1, wherein:
   a pair of switch contacts is connected in series with said emergency power source, said contacts being opened during normal operation and closed during interruption of said A.C. power source.

* * * * *